(12) United States Patent
Sato

(10) Patent No.: US 7,634,116 B2
(45) Date of Patent: Dec. 15, 2009

(54) INFORMATION PROCESSING DEVICE

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 584 days.

(21) Appl. No.: 10/577,728

(22) PCT Filed: Aug. 22, 2005

(86) PCT No.: PCT/JP2005/015595

§ 371 (c)(1),
(2), (4) Date: May 2, 2006

(87) PCT Pub. No.: WO2006/025289

PCT Pub. Date: Mar. 9, 2006

(65) Prior Publication Data

US 2007/0014437 A1    Jan. 18, 2007

(30) Foreign Application Priority Data

Sep. 2, 2004    (JP)    ............................. 2004-256188

(51) Int. Cl.
*G06K 9/00*    (2006.01)
(52) U.S. Cl. ........................... 382/124; 348/65; 348/69; 600/109; 600/178; 359/197
(58) Field of Classification Search ................. 382/124, 382/126, 115, 127, 313, 314, 315, 125, 100, 382/254; 340/5.52, 5.53, 5.82, 5.83, 356; 600/160, 109, 300, 407, 178, 310, 322; 348/68, 348/70, 69, 207.99, 370, 65; 250/208.1; 359/197
See application file for complete search history.

(56) References Cited

U.S. PATENT DOCUMENTS

| | | | | |
|---|---|---|---|---|
| 5,246,002 A | * | 9/1993 | Prosser | 600/336 |
| 5,726,443 A | * | 3/1998 | Immega et al. | 250/227.2 |
| 6,011,860 A | * | 1/2000 | Fujieda et al. | 382/126 |
| 6,292,576 B1 | * | 9/2001 | Brownlee | 382/124 |
| 6,553,134 B1 | * | 4/2003 | Amano et al. | 382/124 |
| 7,084,415 B2 | * | 8/2006 | Iwai | 250/556 |
| 7,327,861 B2 | * | 2/2008 | Choshi et al. | 382/124 |
| 7,366,331 B2 | * | 4/2008 | Higuchi | 382/124 |

FOREIGN PATENT DOCUMENTS

| | | |
|---|---|---|
| JP | 11-128176 | 5/1999 |
| JP | 2003-75135 | 3/2003 |
| JP | 2003-303178 | 10/2003 |
| JP | 2004-54698 | 2/2004 |

* cited by examiner

*Primary Examiner*—Sheela C Chawan
(74) *Attorney, Agent, or Firm*—Oblon, Spivak, McClelland, Maier & Neustadt, L.L.P.

(57) ABSTRACT

The present invention provides an information processing apparatus that can improve immediacy. The information processing apparatus emits a plurality of lights whose wavelengths are different from each other to a living body, disperses the respective lights coming from the living body, separates a plurality of image components corresponding to the respective lights from an image pickup signal output as a result of image pickup by an image pickup element for the respective dispersed lights, and carries out processing corresponding to the respective image components. Thus, it becomes possible to concurrently pick up an image pickup subject without the processing of controlling an optical system, which can reduce processing burden at the time of image pickup.

8 Claims, 4 Drawing Sheets

INFORMATION PROCESSING DEVICE

TECHNICAL FIELD

The present invention relates to an information processing apparatus that is desirably applied to the case of picking up an image of, for example, a blood vessel as a biometrics authentication subject.

BACKGROUND ART

As a subject for biometrics authentication, there is used inherent structure which exists inside a living body such as a blood vessel. Not being stolen directly from a living body and it is difficult for a third party to simulate a registrant as compared with inherent structure which exists on the surface of a living body such as a fingerprint, inherent structure which exists inside a living body is becoming remarkable in enhancing security.

Conventionally, as an authentication apparatus of this type, there is proposed a technique that picks up an image of a blood vessel by utilizing a phenomenon that a light of near infrared ray region is conspicuously absorbed by deoxidized hemoglobin (venous blood) or oxidized hemoglobin (arterial blood) flowing through a blood vessel, and judges whether or not a certain user is a qualified user based on a blood vessel forming pattern in a blood vessel image obtained as the image pickup result (for example, refer to Patent Document 1).

This authentication apparatus emits a near infrared light, whose intensity is higher than that of a reflected light (an ordinary light in the atmosphere of a visible light etc.) coming from a living body, to a finger from the palmar surface of finger, and guides a near infrared light, which is obtained when the near infrared light is absorbed by hemoglobin in the blood vessel structure inside the finger and scattered by other structures other than the blood vessel structure, to a CCD (Charge Coupled Device) through a macrolens that transmits a near infrared light.

Then, with respect to electric charge amount per unit time period charged by the CCD when the near infrared light undergoes photoelectric conversion, the authentication apparatus adjusts the CCD such that the image pickup sensitivity of the CCD for the near infrared light becomes higher than that for an ordinary light to generate a blood vessel image signal, then the authentication apparatus judges whether or not a certain user is a qualified user based on a blood vessel forming pattern in the blood vessel image signal.

Accordingly, the authentication apparatus can reduce the noise component based on an ordinary light in the atmosphere of a visible light, etc. and improve the image quality of a blood vessel image, which consequently can improve the authentication precision.

Patent Document 1: Jpn. Pat. Appln. Laid-Open Publication No. 2004-135609

When a finger is out of alignment in position at the time of picking up an image, even if the image quality of a blood vessel image is favorable, thus configured authentication apparatus undesirably brings about degradation of authentication precision.

As a countermeasure to prevent degradation of authentication precision resulting from the positional misalignment, there may be proposed a method to detect positional misalignment of a blood vessel image from a reference image. On the other hand, since a blood vessel image is an image inside a living body, the detection precision becomes high when detecting positional misalignment using information on the surface of a living body.

In case of applying this detection method to the authentication apparatus, the authentication apparatus has to pick up both an image of the surface of a living body and an image of a blood vessel inside the living body, which undesirably requires processing burden by just that much and lowers immediacy. In this case, when it is assumed that the focal depth is adjusted for both the surface of a living body and a blood vessel inside the living body, control processing for an optical system for adjusting the focal depth becomes complicated due to the difference of depth of a blood vessel from the surface of skin depending on the level of fat of a living body, which undesirably further lowers immediacy.

DISCLOSURE OF THE INVENTION

Accordingly, the present invention has an object to overcome above-mentioned drawbacks of the prior art by providing an information processing apparatus that can improve immediacy.

Also the above object can be attained by providing an information processing apparatus, which includes an emitting means for emitting a plurality of lights whose wavelengths are different from each other to a living body, a dispersion means for dispersing the respective lights coming from the living body, a separation means for separating a plurality of image components corresponding to the respective lights from an image pickup signal output as a result of image pickup by an image pickup element for the respective lights dispersed by the dispersion means, and a signal processing means for carrying out processing corresponding to the respective image components separated by the separation means.

Therefore, according to the present invention, it becomes possible to concurrently pick up an image pickup subject without the processing of controlling an optical system, which can reduce processing burden at the time of image pickup.

The information processing apparatus according to the present invention emits a plurality of lights whose wavelengths are different from each other to a living body, disperses the respective lights coming from the living body, separates a plurality of image components corresponding to the respective lights from an image pickup signal output as a result of image pickup by an image pickup element for the respective dispersed lights, and carries out processing corresponding to the respective separated image components. Therefore, it becomes possible to concurrently pick up an image pickup subject without the processing of controlling an optical system, which can reduce processing burden at the time of image pickup. Accordingly, an information processing apparatus that can improve immediacy can be realized.

BEST MODE FOR CARRYING OUT THE INVENTION

The present invention will further be described below concerning the best modes for carrying out the present invention with reference to the accompanying drawings.

(1) Entire Configuration of Authentication Apparatus

Figure 1:
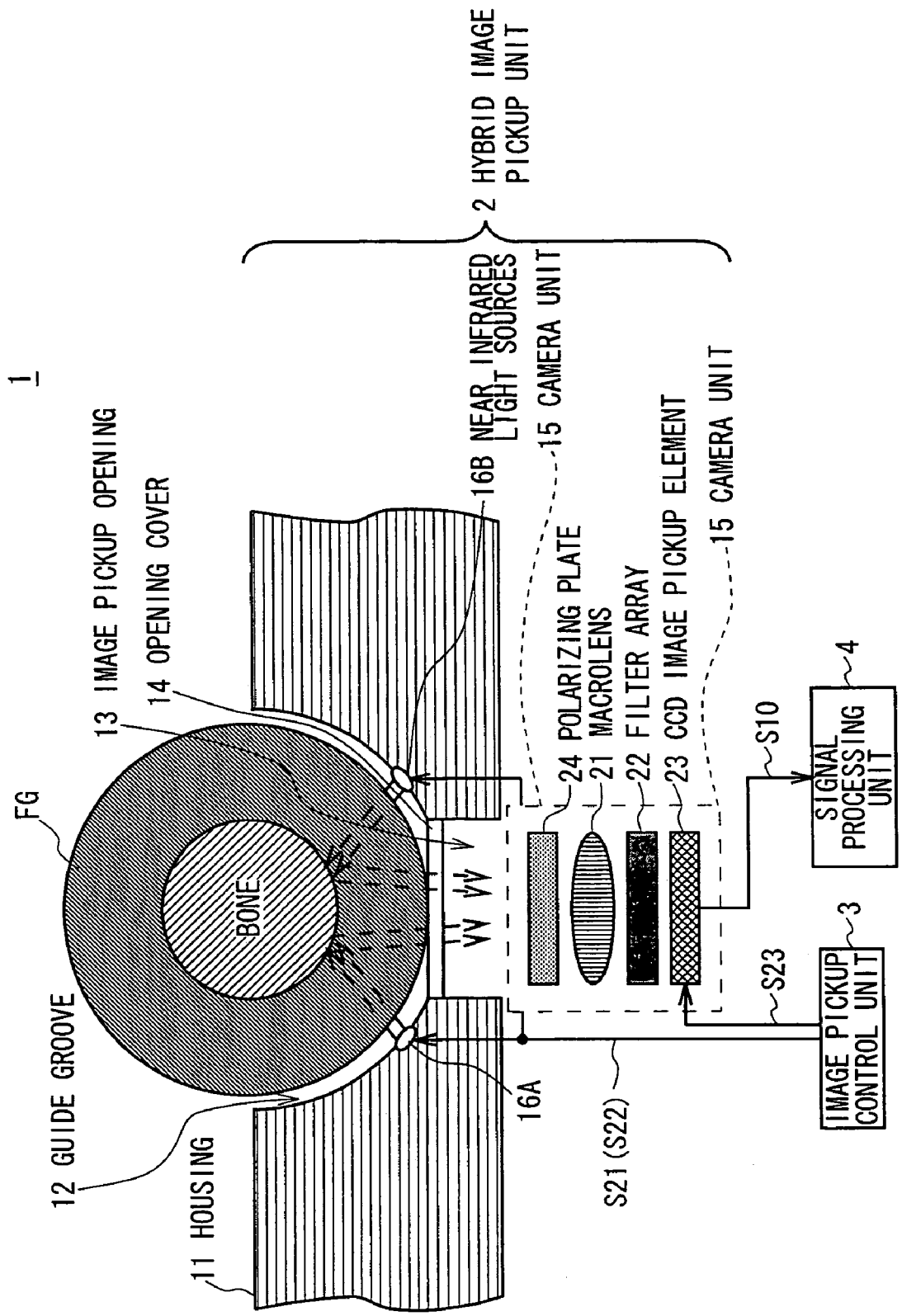
FIG. 1 shows a schematic view of the entire configuration of an authentication apparatus according to the present invention.

FIG. 1 shows a schematic view of the entire configuration of an authentication apparatus 1 according to the present invention, which includes a hybrid image pickup unit 2 that picks up an image of the surface of a finger FG of a living body as well as picks up an image of a blood vessel inside the finger FG as an authentication subject, an image pickup control unit 3 that controls the operation of making the hybrid image pickup unit 2 concurrently pick up images of the finger FG surface as well as of the finger FG blood vessel, and a signal processing unit 4 that carries out various processing based on an image pickup signal output from the hybrid image pickup unit 2 as the image pickup result.

(1 1) Configuration of Blood Vessel Image Pickup Unit

Figure 2:
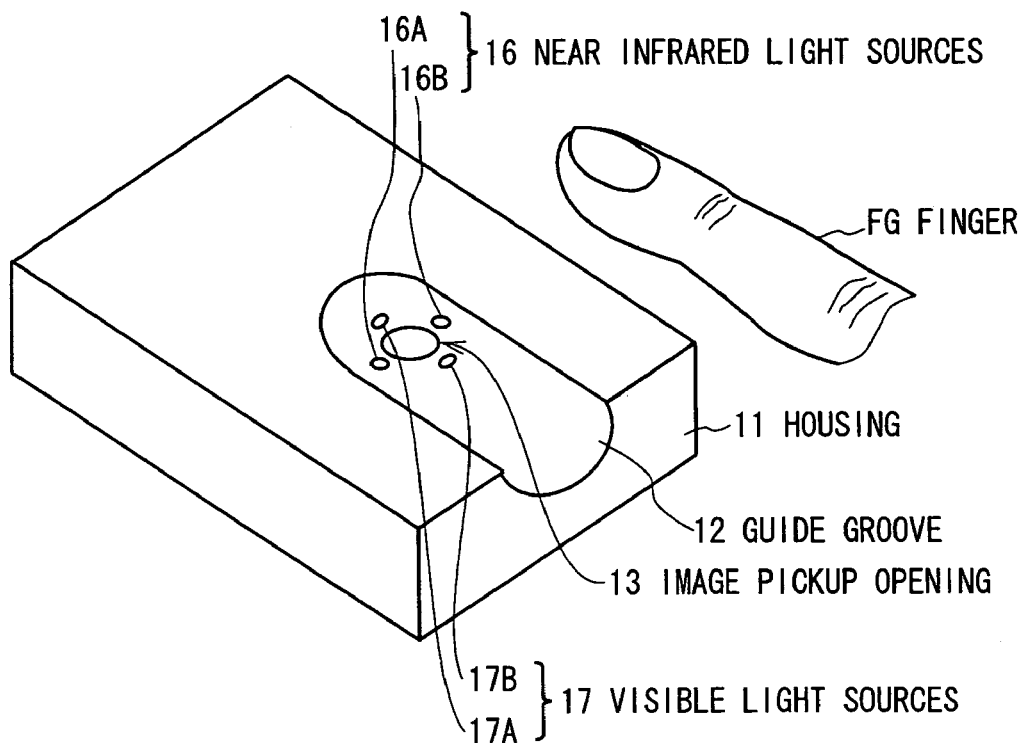
FIG. 2 shows a schematic view of the outline configuration of a blood vessel image pickup unit.

As shown in FIG. 1 and FIG. 2, the hybrid image pickup unit 2 has a housing 11 substantially in the form of a rectangular solid, and the housing 11 has formed on the upper surface thereof a guide groove 12 that is rounded and so formed as to model after a finger, and the guide groove 12 has arranged at the bottom around the leading edge thereof an image pickup opening 13.

Accordingly, the hybrid image pickup unit 2 guides the finger pad of the finger FG, which is so placed as to fit on the guide groove 12, to the image pickup opening 13, and the position of the image pickup opening 13 for the finger FG that is placed with its fingertip made to abut on the leading edge of the guide groove 12 is determined according to a person to be picked up.

The image pickup opening 13 has arranged on the surface thereof an opening cover 14 that is water-clear and made of a predetermined material, and there is arranged a camera unit 15 right under the image pickup opening 13 inside the housing 11.

Consequently, the hybrid image pickup unit 2 can prevent foreign matters from getting into the housing 11 from the image pickup opening 13, and concurrently prevent the camera unit 15 from being contaminated due to the placement of the finger FG on the image pickup opening 13 beforehand.

On the other hand, on the sides of the guide groove 12, a pair of near infrared light sources 16 (16A and 16B) each of which emits a near infrared light as a light to pick up an image of a blood vessel are so arranged as to be in parallel with the width direction of the guide groove 12 to sandwich the image pickup opening 13.

Each of the near infrared light sources 16 emits a near infrared light of a wavelength range of approximately 700 to 1000 nm having wavelength dependence on both oxidized hemoglobin and deoxidized hemoglobin flowing through a blood vessel (referred to as blood vessel dependence wavelength range, hereinafter).

Furthermore, as shown in FIG. 2, each of the near infrared light sources 16 emits a near infrared light not from a direction perpendicular to an image pickup surface of the camera unit 15 but from an emitting direction "id" which forms an acute angle á together with the image pickup surface F1 (referred to as a near infrared light emitting direction, hereinafter) so as to reduce the surface reflection by the finger pad. In this case, an emitting direction forming 30 to 60 together with the image pickup surface of the camera unit 15 is effective.

Accordingly, the hybrid image pickup unit 2 emits near infrared lights to the sides of the finger pad of the finger FG placed on the guide groove 12 from the near infrared light sources 16. At this time, the near infrared lights are absorbed by hemoglobin in the blood vessel structure existing inside the finger FG and scattered by other structures other than the blood vessel structure to go through the inside of the finger FG, and go to the camera unit 15 through the image pickup opening 13 and the opening cover 14 sequentially from the finger FG as blood vessel projection lights. Generally, in the capillary blood vessel structure of the finger FG, there mixedly exist oxidized hemoglobin and deoxidized hemoglobin. Since near infrared lights of the blood vessel dependence wavelength range which have wavelength dependence on both hemoglobin are emitted, the capillary blood vessel structure of the finger FG is highly reflected on the blood vessel projection lights.

On the other hand, on the guide groove 12, a pair of visible light sources 17 (17A and 17B) each of which emits a visible light as a light to pick up an image of a fingerprint are so arranged as to be in parallel with the longitudinal direction of the guide groove 12 to sandwich the image pickup opening 13. Each of the visible light sources 17 emits a visible light from an emitting direction substantially perpendicular to the image pickup surface of the camera unit 15 (referred to as a visible light emitting direction, hereinafter).

Accordingly, the hybrid image pickup unit 2 emits visible lights to the center of the finger pad of the finger FG placed on the guide groove 12 from the visible light sources 17. At this time, the visible lights are reflected by the finger FG surface, and go to the camera unit 15 through the image pickup opening 13 and the opening cover 14 sequentially as finger surface projection lights.

The camera unit 15 has arranged therein sequentially a macrolens 21, a filter array 22, and a CCD image pickup element 23 on the optical path of the lights coming from the opening cover 14.

The macrolens 21 condenses the blood vessel projection lights and the finger surface projection lights coming from the opening cover 14 onto the filter array 22.

The filter array 22 has arranged therein a plurality of pixel filters each of which forms a unit to transmit a light of a wavelength corresponding to a predetermined color (referred to as color dispersion unit, hereinafter), forming a lattice pattern, and an "R" pixel filter, a "G" pixel filter, and a "B" pixel filter are employed as the color dispersion unit in this embodiment.

In this case, as shown in FIG. 4A and FIG. 4B, of four pixel filters adjacent to each other, the upper left pixel filter and the lower right pixel filter are set to the "G" pixel filter that transmits a light of a wavelength range of approximately 500 to 600 nm, the upper right pixel filter is set to the "B" pixel filter that transmits a light of a wavelength range of approximately 400 to 500 nm, and the lower left pixel filter is set to the "R" pixel filter that transmits a light of a wavelength range of approximately 600 to 700 nm, thereby forming the filter array 22 as a general RGB filter array.

In this regard, the filter array 22 is different from a general RGB filter array in the point that the "R" pixel filters transmit a light of the blood vessel dependence wavelength range (approximately 700 to 1000 nm).

Accordingly, the filter array 22 can color-disperse the finger surface projection lights and the blood vessel projection lights coming from the macrolens 21.

The CCD image pickup element 23 has a plurality of photoelectric conversion elements on the image pickup surface thereof which are arranged corresponding to pixels to form a lattice pattern, and performs photoelectric conversion for the blood vessel projection lights and the finger surface projection lights going to the image pickup surface. Then, the CCD image pickup element 23 reads out electric charge which is charged by the photoelectric conversion under the control of the image pickup control unit 3, and outputs thus read out electric charge to the signal processing unit 4 as an image pickup signal S10.

As described above, near infrared lights going to the camera unit 15 from the opening cover 14 mixedly includes those coming from the inside of the finger FG (blood vessel projection lights) and those reflected mainly by the finger FG surface (near infrared lights reflected by the finger FG surface are referred to as surface reflection near infrared lights, hereinafter). The surface reflection near infrared lights go to the camera unit 15 mainly from directions perpendicular to the near infrared light emitting directions.

On the other hand, the blood vessel projection lights and the finger surface projection lights going from the opening cover 14 to the camera unit 15 come usually from a direction substantially perpendicular to or perpendicular to the image pickup surface due to a bone existing at the center of a finger in cross section and emitting directions.

Accordingly, the camera unit 15 additionally has a polarizing plate 24 that has the polarization axis in a direction perpendicular to a direction which is vertical to the near infrared light emitting directions and has the polarization axis in a direction parallel to the visible light emitting directions, which is arranged above the macrolens 21.

Having the polarization axis in a direction perpendicular to a direction which is vertical to the near infrared light emitting directions, the polarizing plate 24 can deviate the surface reflection near infrared lights going to the camera unit 15 from the optical path, and furthermore, having the polarization axis in a direction parallel to the visible light emitting directions, the polarizing plate 24 can transmit the blood vessel projection lights and the finger surface projection lights which travel vertically to the image pickup surface.

Therefore, the camera unit 15 selectively guides the blood vessel projection lights and the finger surface projection lights coming from the opening cover 14 to the image pickup surface of the CCD image pickup element 23 to pick up an image.

In this way, the hybrid image pickup unit 2 can pick up an image of the surface of the finger FG as well as an image of a blood vessel existing inside the finger FG.

(1 2) Configuration of Image Pickup Control Unit

Figure 3:
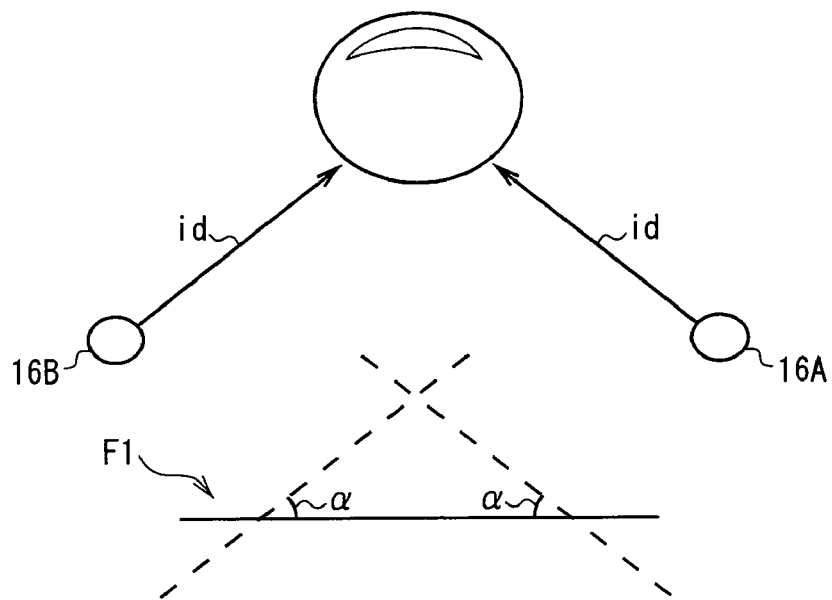
FIG. 3 shows a schematic view indicative of the directions of emitting near infrared lights.

The image pickup control unit 3 (FIG. 1 and FIG. 3) drives and controls the near infrared light sources 16, visible light sources 17, and CCD image pickup element 23, respectively.

Actually, the image pickup control unit 3 generates a near infrared light source control signal S21 of a first voltage level and a visible light source control signal S22 of a second voltage level from power voltage supplied from a main power source section (not shown) arranged in the authentication apparatus 1. Then, the image pickup control unit 3 applies the near infrared light source control signal S21 and the visible light source control signal S22 to the corresponding near infrared light sources 16 and visible light sources 17 to drive them.

As a result, near infrared lights are emitted from the near infrared light emitting directions to the sides of the finger pad of the finger FG placed on the guide groove 12, and concurrently, visible lights are emitted from the visible light emitting directions to the center of the finger pad of the finger FG.

At this time, the finger surface projection lights coming from the finger FG surface and the blood vessel projection lights coming through the inside of the finger FG concurrently are incident on the image pickup surface of the CCD image pickup element 23.

On the other hand, the image pickup control unit 3 generates a CCD image pickup element control signal S23 of a predetermined duty ratio based on a clock signal supplied from a clock generation unit (not shown) and outputs thus generated CCD image pickup element control signal S23 to the CCD image pickup element 23 for driving.

As a result, in the CCD image pickup element 23, setting the falling point (or rising point) of the CCD image pickup element control signal S23 as a reading out point, electric charge which is charged as the result of photoelectric conversion for the finger surface projection lights and the blood vessel projection lights by the reading out point is sequentially output to the signal processing unit 4 as an image pickup signal S10.

In this way, the image pickup control unit 3 controls the hybrid image pickup unit 2 to concurrently pick up images of the finger FG surface as well as of the finger FG blood vessel.

(1 3) Configuration of Signal Processing Unit

Figure 5:
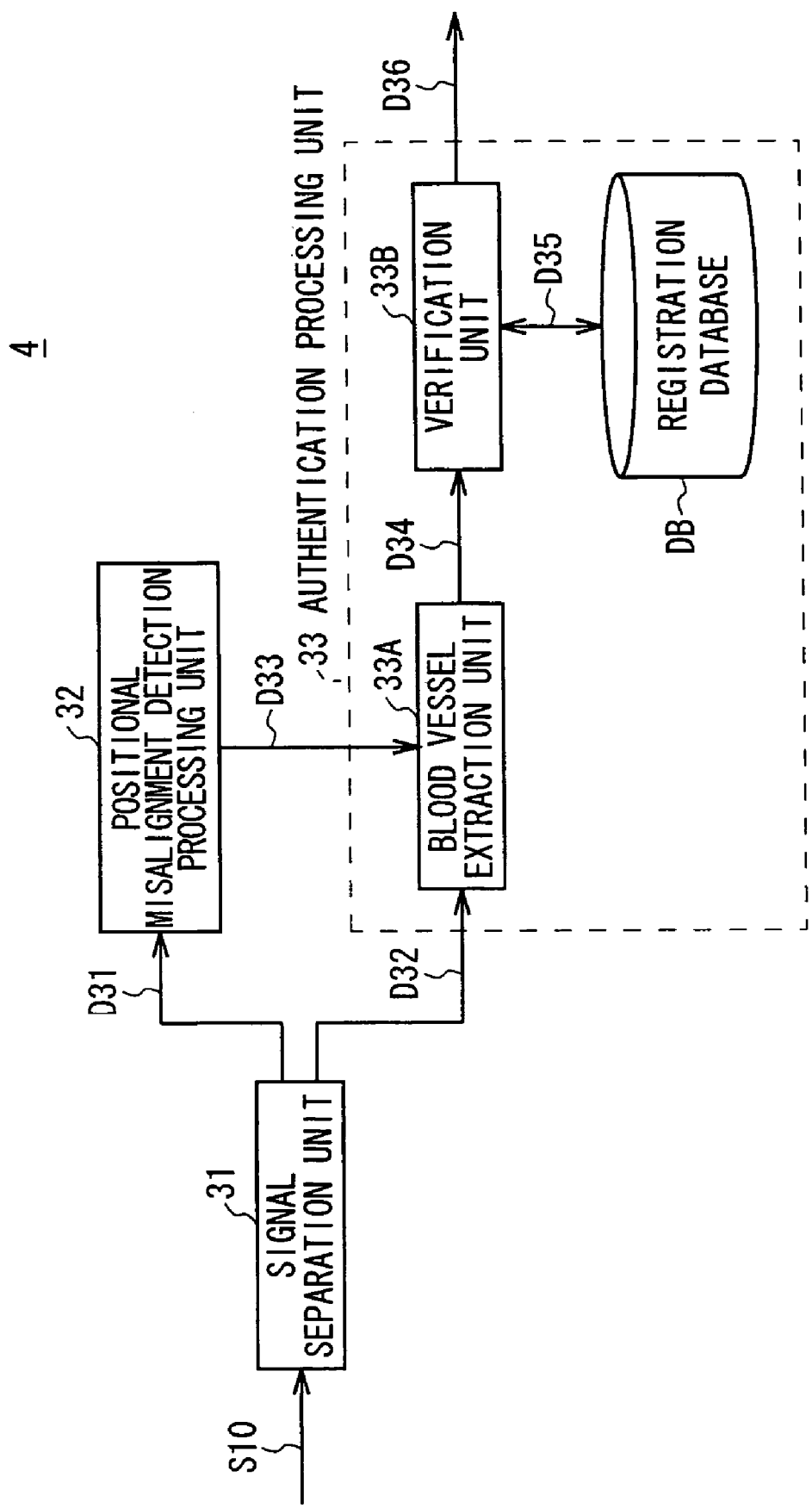
FIG. 5 shows a block diagram of a signal processing unit.

As shown in FIG. 5, the signal processing unit 4, includes a signal separation unit 31 that separates a first image signal component corresponding to the finger surface projection lights (referred to as finger surface image component, hereinafter) and a second image signal component corresponding to the blood vessel projection lights (referred to as blood vessel image component, hereinafter) from the image pickup signal S10, a positional misalignment detection processing unit 32 that carries out positional misalignment detection processing for a blood vessel image in the blood vessel image component based on the finger surface image component, and an authentication processing unit 33 that carries out authentication processing based on the blood vessel image component.

The signal separation unit 31 generates image pickup data by performing A/D (Analog/Digital) conversion for the image pickup signal S10 output from the CCD image pickup element 23.

Then, the signal separation unit 31 extracts pixel data corresponding to, for example, "G" from the image pickup data for each color dispersion unit, and sends thus extracted pixel data group to the positional misalignment detection processing unit 32 as data of the finger surface image component (referred to as finger surface image data, hereinafter) D31.

Furthermore, the signal separation unit 31 extracts pixel data corresponding to "R" from the image pickup data for each color dispersion unit, and sends thus extracted pixel data group to the authentication processing unit 33 as data of the blood vessel image component (referred to as blood vessel image data, hereinafter) D32.

In this way, the signal separation unit 31 can separate the finger surface image component and the blood vessel image component corresponding to the blood vessel projection lights from the image pickup signal S10.

The positional misalignment detection processing unit 32 retains an image of the finger FG surface placed at a reference position (referred to as reference finger surface image, hereinafter), and calculates the cross-correlation between the reference finger surface image and a finger surface image of the finger surface image data D31 to detect the state of positional misalignment of the finger surface image in the X direction and Y direction.

Then, the positional misalignment detection processing unit 32 sends the detection result to the authentication processing unit 33 as data (referred to as position correction data, hereinafter) D33 to correct the position of a blood vessel image based on the blood vessel image data D32.

In this way, by detecting the positional misalignment state of the finger FG at the time of image pickup using image pickup result for the finger FG surface, the positional misalignment detection processing unit 32 can detect the positional misalignment state more accurately by reduced noise component arising from scattering etc. as compared with the case in which image pickup result for the inside of a living body is used.

In this case, using pixel data corresponding to "G" whose light amount is the largest among the color dispersion units (finger surface image data D31) as the image pickup result for the finger FG surface, the positional misalignment detection processing unit 32 can enhance the resolution of the finger surface image, which consequently makes it possible to detect the positional misalignment state with higher accuracy.

The authentication processing unit 33 includes a blood vessel extraction unit 33A and a verification unit 33B, and the blood vessel extraction unit 33A receives the blood vessel image data D32 supplied from the signal separation unit 31 and the position correction data D33 supplied from the positional misalignment detection processing unit 32.

The blood vessel extraction unit 33A shifts the position of a blood vessel image based on the blood vessel image data D32 by an amount corresponding to the position correction data D33 for correction, and performs the median filter processing for thus corrected blood vessel image data D32 to remove noise component.

Then, the blood vessel extraction unit 33A performs, for example, the Laplacian processing for the blood vessel image data D32 which has its noise component removed, and highlights the blood vessel contour of a blood vessel image based on the blood vessel image data D32 for extraction, and sends the blood vessel image whose blood vessel contour is thus extracted to the verification unit 33B as authentication information D34.

The verification unit 33B performs registration mode or authentication mode in answer to a mode determination signal supplied from an operation unit (not shown) and at the time of the registration mode, the verification unit 33B registers authentication information D34 supplied from the blood vessel extraction unit 33A to a registration database DB as registration authentication information D35.

On the other hand, at the time of the authentication mode, the verification unit 33B calculates the cross-correlation between a blood vessel image of the authentication information D34 supplied from the blood vessel extraction unit 33A and a blood vessel image of the registration authentication information D35 registered in the registration database DB, and verifies blood vessel forming patterns of the blood vessel images.

As the verification result, in case a cross-correlation value that is equal to or lower than a predetermined threshold value is acquired, the verification unit 33B determines that a person imaged by the hybrid image pickup unit 2 is not a registrant registered in the registration database DB, while in case a cross-correlation value that is higher than the predetermined threshold value is acquired, the verification unit 33B determines that the person imaged by the unit 2 is a registrant. Then, the verification unit 33B outputs the determination result to the outside as determination data D36.

In this way, since the authentication processing unit 33 performs authentication processing using a blood vessel forming pattern which exists inside a living body, it becomes possible to prevent steal directly from a living body and prevent a third party from simulating a registrant, as compared with the case of performing authentication processing using a fingerprint forming pattern, etc. which exists on the surface of a living body.

In this case, correcting positional misalignment of a blood vessel image as preprocessing for authentication processing, the authentication processing unit 33 can avoid erroneous determination concerning whether or not being registered as a registrant resulting from positional misalignment of the finger FG at the time of image pickup, which can prevent degradation of the authentication precision (verification precision) resulting from the positional misalignment beforehand.

Furthermore, in this case, the authentication processing unit 33 does not detect positional misalignment from image pickup result (blood vessel image) inside the finger FG in which there exist many image quality deterioration factors comparatively, but performs correction using the position correction data D33 detected from image pickup result (fingerprint image) in which there exist less image quality deterioration factors as compared with the image pickup result inside the finger FG, which can make it possible to correct positional misalignment of a blood vessel image easily with high accuracy, and as a result, degradation of the authentication precision (verification precision) can be further prevented.

(2) Performance and Effect

Under above-described configuration, the authentication apparatus 1 concurrently emits first lights (visible lights) and second lights (near infrared lights) whose wavelength is different from that of the first lights to a living body, and makes mainly the "G" pixel filters of the filter array 22 transmit the first lights (finger surface projection lights which are visible lights) coming from the living body, and makes the "R" pixel filters transmit the second lights (blood vessel projection lights which are near infrared lights), thereby dispersing the lights.

Then, the authentication apparatus 1 separates a first image signal component corresponding to the first lights (finger surface image data D31) and a second image signal component corresponding to the second lights (blood vessel image data D32) from the image pickup signal S10 output as image pickup result by the image pickup element for thus dispersed first lights and second lights, and performs a first processing (positional misalignment correction processing) based on the first image signal component (finger surface image data D31) as well as a second processing (authentication processing) based on the second image signal component (blood vessel image data D32).

Accordingly, concurrently picking up an image pickup subject and carrying out different processing using the image pickup result, the authentication apparatus 1 does not have to pick up the image pickup subject twice, which can reduce processing burden at the time of image pickup.

In this processing, since the authentication apparatus 1 does not carry out the processing of separating the first image signal component and the second image signal component using only a signal processing system, employing complicated signal processing can be avoided as well as processing of controlling an optical system can be avoided, which can further reduce processing burden at the time of image pickup. Furthermore, in this case, the authentication apparatus 1 can avoid physically switching optical systems at the time of image pickup, which can realize miniaturization.

Moreover, the authentication apparatus 1 employs visible lights as first lights, employs near infrared lights as second lights whose wavelength is different from that of the first lights and which have dependence on a blood vessel inside a living body being an authentication subject, and disperses the finger surface projection lights (visible lights) coming from the surface of the living body and the blood vessel projection lights (near infrared lights) coming through the inside of the living body. Accordingly, the authentication apparatus 1 can concurrently obtain lights of different characteristics in the depth direction of the living body, and can reduce processing burden at the time of image pickup.

In this case, the authentication apparatus 1 detects the state of positional misalignment of a blood vessel image in the second image signal component corresponding to the blood vessel projection lights (near infrared lights) based on an image signal component corresponding to the finger surface projection lights (visible lights), and performs authentication processing based on the second image signal component that is corrected according to the detection result.

Accordingly, the authentication apparatus 1 does not detect positional misalignment from the second image signal component inside the finger FG in which there exist many image quality deterioration factors comparatively, but performs correction using the result detected from the first image signal component in which there exist less image quality deterioration factors as compared with the image pickup result inside the finger FG, which can make it possible to correct positional misalignment of a blood vessel image of the second image signal component easily with high accuracy, and as a result, degradation of the authentication precision can be prevented.

According to above-described configuration, the first lights of a first wavelength and the second lights whose wavelength is different from the first wavelength are emitted to the living body, and after separating the first image signal component corresponding to the first lights and the second image signal component corresponding to the second lights from the image pickup signal S10 output as the image pickup result by the image pickup element for the first lights and the second lights coming from the living body, the first processing is performed based on the first image signal component and the second processing is performed based on the second image signal component, which does not require picking up an image pickup subject second twice, and can reduce processing burden at the time of image pickup, thereby realizing an information processing apparatus that can improve immediacy.

(3) Other Embodiments

In above-described embodiment, as an emitting means for emitting a plurality of lights whose wavelengths are different from each other to a living body, two kinds of lights, or visible lights and near infrared lights, of a wavelength range of 700 to 1000 nm having dependence on a blood vessel being an authentication subject are employed. On the other hand, the present invention is not restricted to this, and there may be employed methods of selecting a plurality of lights whose wavelengths are different from each other according to the application of embodiments to emit thus selected lights to a living body. Specifically, there may be employed a method of injecting markers which have specific properties for a nidus inside a living body and emitting third lights of a wavelength which is different from those of the visible lights and the near infrared lights and has dependence on the markers, or a method of injecting markers which have specific properties for an authentication subject (inherent structure) inside a living body and emitting lights of a wavelength which is different from that of the visible lights and has dependence on the markers instead of the near infrared lights having dependence on a blood vessel being an authentication subject.

Figure 4:
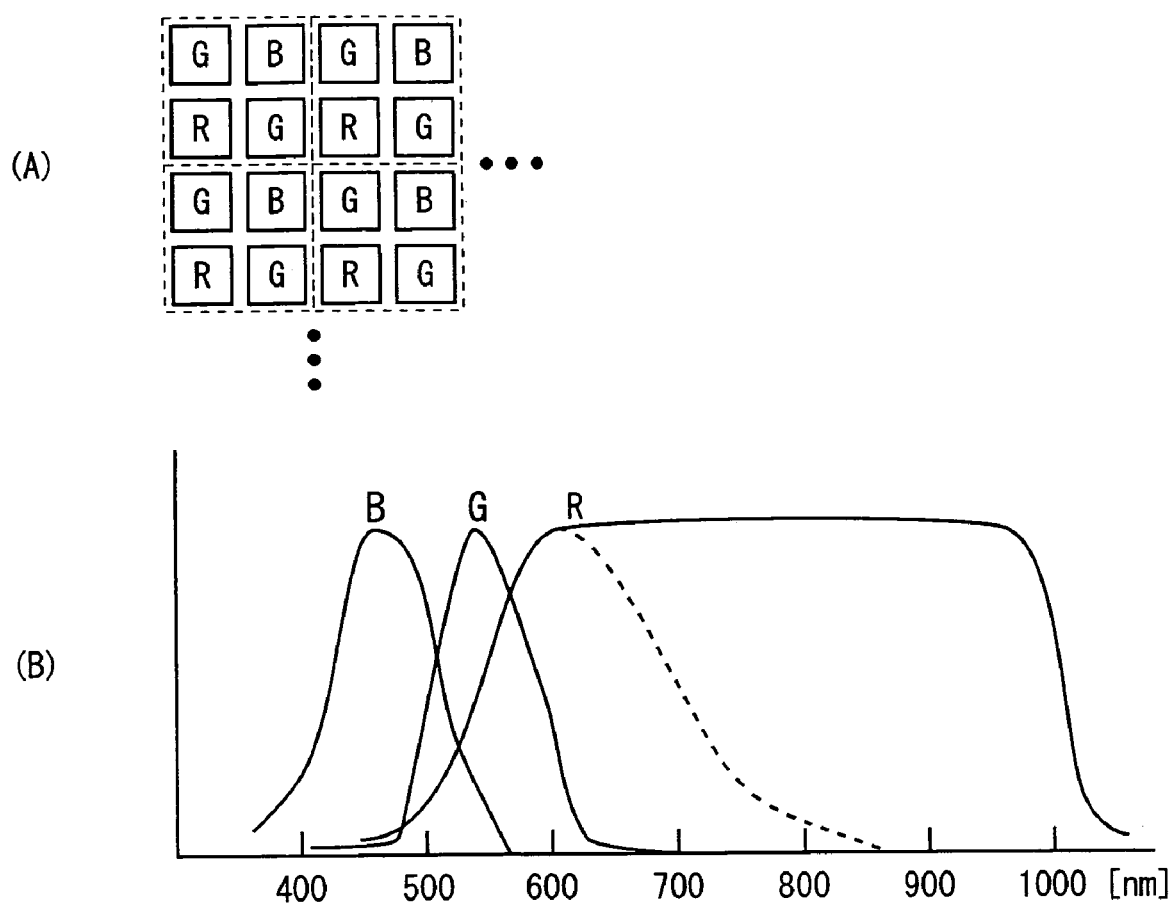
FIG. 4 shows schematic views indicative of the unit of configuration of a filter array and the characteristics thereof.

In above-described embodiment, as a dispersion means for dispersing respective lights coming from a living body, the filter array 22 of RGB system shown in FIG. 4 is employed. On the other hand, the present invention is not restricted to this, and a filter array of various kinds may be employed.

For example, there may be employed a filter array of complementary color system that color-disperses visible lights (finger surface projection lights) coming from the surface of a living body into colors of "Cy", "Ye", "Mg", and "G". As color dispersion unit in the filter array of the complementary color system, various color dispersion units may be employed. In this case, since a pixel filter corresponding to "Mg" transmits an infrared light in a filter array of complementary color system generally, there is brought about an advantage that the filter array can be employed without changing the filter properties particularly.

Furthermore, for example, the filter array 22 whose "R" pixel filters transmit also lights of the blood vessel dependence wavelength range (approximately 700 to 1000 nm) is employed. On the other hand, instead of this, a generally used RGB filter may be employed. In this case, even if being a general RGB filter array, "R" pixel filters are not so configured as to cut near infrared lights around a wavelength corresponding to "R" in the strict sense. Thus, the resolution of the blood vessel image data D32 that is obtained by extracting image data corresponding to "R" for each color dispersion unit becomes deteriorated as compared with above-described embodiment, which does not affect the authentication processing result, though. Accordingly, in this case, effects similar to those of above-described embodiment can be obtained. Moreover, as the color dispersion units of the RGB filter array, various kinds may be employed instead of those shown in FIG. 4A.

Moreover, a filter array in which pixel filters that transmit a visible light, a near infrared light and/or a third light are configured as the color dispersion units may be employed. In this case, since this filter array is not a generally used filter array, the manufacturing cost is raised. On the other hand, there is brought about an advantage that a plurality of lights which are emitted by an emitting means can be dispersed with high accuracy. Especially, this filter array is effectively employed in the case of injecting markers which have specific properties for a nidus inside a living body and emitting third lights of a wavelength which is different from those of visible lights and near infrared lights and has dependence on the markers.

Furthermore, in above-described embodiment, as a separation means for separating a plurality of image components corresponding to respective lights from an image pickup signal output as a result of image pickup by an image pickup element for the respective lights dispersed by a dispersion means, the signal separation unit 31 that extracts pixel data corresponding to "G" (or "R") for each color dispersion unit is employed. On the other hand, as for the extraction method, various kinds may be employed according to the number of pixels of color dispersion unit in a filter array or the kind of filter array.

Yet, furthermore, in above-described embodiment, as a signal processing means for carrying out processing corresponding to respective image components separated by the separation means, the signal processing unit 4 that detects the state of positional misalignment of a blood vessel image in the second image signal component corresponding to the blood vessel projection lights (near infrared lights) based on the first image signal component corresponding to the finger surface projection lights (visible lights), and performs authentication processing based on the second image signal component that is corrected according to the detection result is employed. On the other hand, the preset invention is not restricted to this, and the signal processing unit 4 of different configuration may be employed.

For example, the signal processing unit 4 may detect the positional misalignment state of a blood vessel image in the second image signal component corresponding to the blood vessel projection lights (near infrared lights) based on the image signal component corresponding to the finger surface projection lights (visible lights), and perform fingerprint verification processing with fingerprint images which are registered in advance. Then, in case it is determined that a person imaged is a registrant as a result of fingerprint verification processing, the signal processing unit 4 performs authentication processing based on the second image signal component that is corrected according to the detection result. Accordingly, the authentication precision in the authentication apparatus 1 can be further improved.

Furthermore, in case of injecting markers which have specific properties for a nidus inside a living body and emitting third lights of a wavelength which is different from those of the visible lights and the near infrared lights and has dependence on the markers, the signal processing unit 4 may generate tomographic image data based on the third lights. Then, similar to above-described embodiment, the signal processing unit 4 performs authentication processing based on the second image signal component that is corrected according to the detection result of positional misalignment. In case it is determined that a person imaged is a registrant as a result of authentication processing, the signal processing unit 4 registers the tomographic image data to a database or displays the tomographic image on a display unit.

In this way, similar to above-described emitting means, the signal processing means can select processing corresponding to respective image components separated by the separation means according to the application of embodiments, and perform the processing respectively.

Furthermore, in above-described embodiment, as an image pickup element, the CCD image pickup element 23 is employed. On the other hand, the present invention is not restricted to this, and other kinds of image pickup elements such as a CMOS (Complementary Metal Oxide Semiconductor) may be employed instead. In this case, effects similar to those of above-described embodiment can be obtained.

Furthermore, in above-described embodiment, the hybrid image pickup unit 2 that emits near infrared lights from the sides of the finger pad of the finger FG, and picks up an image of the blood vessel projection lights coming from the sides of the finger pad of the finger through the inside of the finger FG. On the other hand, the present invention is not restricted to this, and there may be employed a hybrid image pickup unit that emits near infrared lights from the sides of the back of the finger FG, and picks up an image of the blood vessel projection lights coming from the sides of the finger pad of the finger through the inside of the finger FG. In case of employing this hybrid image pickup unit, effects similar to those of above-described embodiment can be obtained. The hybrid image pickup unit 2 is configured as shown in FIG. 1 and FIG. 2. On the other hand, the hybrid image pickup unit 2 of different configuration may be employed.

INDUSTRIAL APPLICABILITY

The present invention can be utilized when observing an image pickup subject multilaterally.

The invention claimed is:

1. An information processing apparatus, comprising:
   emitting means for emitting a plurality of lights whose wavelengths are different from each other to a living body;
   dispersion means for dispersing the respective lights coming from the living body;
   separation means for spatially color-dispersing a plurality of image components corresponding to the respective lights from an image pickup signal output as a result of image pickup by an image pickup element for the respective lights dispersed by the dispersion means; and
   signal processing means for carrying out processing corresponding to the respective image components separated by the separation means.

2. The information processing apparatus according to claim 1, wherein
   the emitting means emits first lights, and second lights whose wavelength is different from that of first wavelength and which have dependence on an authentication subject existing inside the living body,
   the dispersion means disperses the first lights coming from a surface of the living body and the second lights coming through inside of the living body,
   the separation means separates a first image component corresponding to the first lights and a second image component corresponding to the second lights from an image pickup signal output as a result of image pickup by an image pickup element for the first lights and the second lights dispersed by the dispersion means, and
   the signal processing means carries out processing corresponding to the first image component and the second image component, respectively.

3. The information processing apparatus according to claim 2, wherein
   the signal processing means detects a state of positional misalignment of an image with respect to the second image component based on the first image component, and carries out authentication processing based on the second image component corrected according to a detection result.

4. The information processing apparatus according to claim 2, wherein
   the signal processor detects a state of positional misalignment of an image with respect to the second image component based on the first image component, and carries out authentication processing based on the second image component corrected according to a detection result.

5. The information processing apparatus according to claim 1, wherein
   the emitter emits first lights, and second lights whose wavelength is different from that of first wavelength and which have dependence on an authentication subject existing inside the living body,
   the light dispersion mechanism disperses the first lights coming from a surface of the living body and the second lights coming through inside of the living body,
   the light separator separates a first image component corresponding to the first lights and a second image component corresponding to the second lights from an image pickup signal output as a result of image pickup by an image pickup element for the first lights and the second lights dispersed by the dispersion means, and
   the signal processor carries out processing corresponding to the first image component and the second image component, respectively.

6. The information processing apparatus of claim 1, wherein the separation means for spatially color-dispersing a plurality of image components is configured as a filter array means having four adjacent pixel filters forming a lattice pattern.

7. An information processing apparatus, comprising:
- an emitter configured to emit a plurality of monochromatic lights whose wavelengths are different from each other to a living body;
- a light dispersion mechanism configured to disperse the respective lights coming from the living body;
- a light separator configured to spatially color-disperse a plurality of image components corresponding to the respective lights from an image pickup signal output as a result of image pickup by an image pickup element for the respective lights dispersed by the dispersion means; and
- a signal processor configured to process corresponding respective image components separated by the light separator.

8. The information processing apparatus of claim 7, wherein the light separator for spatially color-dispersing a plurality of image components as configured as a filter array having four adjacent pixel filters forming a lattice pattern.

\* \* \* \* \*